(12) United States Patent
Aoki

(10) Patent No.: US 9,495,576 B2
(45) Date of Patent: Nov. 15, 2016

(54) IMAGE PROCESSING APPARATUS, BIOMETRIC AUTHENTICATION APPARATUS, AND IMAGE PROCESSING APPARATUS

(71) Applicant: FUJITSU LIMITED, Kawasaki-shi, Kanagawa (JP)

(72) Inventor: Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 57 days.

(21) Appl. No.: 14/596,543

(22) Filed: Jan. 14, 2015

(65) Prior Publication Data
US 2015/0254492 A1 Sep. 10, 2015

(30) Foreign Application Priority Data

Mar. 10, 2014 (JP) ................................. 2014-046939

(51) Int. Cl.
*G06K 9/00* (2006.01)
*G06K 9/20* (2006.01)

(52) U.S. Cl.
CPC ....... *G06K 9/00033* (2013.01); *G06K 9/00201* (2013.01); *G06K 9/2027* (2013.01)

(58) Field of Classification Search
CPC .................... G06K 9/00033; G06K 9/00201; G06K 9/2027; H04N 5/2354
USPC .......................... 382/115, 117, 124, 209, 218
See application file for complete search history.

(56) References Cited

U.S. PATENT DOCUMENTS

| | | | | |
|---|---|---|---|---|
| 7,187,786 B2* | 3/2007 | Kee | ..................... | G07C 9/00158 382/118 |
| 8,106,966 B2* | 1/2012 | Chou | ................... | H04N 5/2351 348/222.1 |
| 8,527,141 B2* | 9/2013 | Takahashi | ............... | G01S 7/497 701/26 |
| 2006/0290781 A1 | 12/2006 | Hama | | |
| 2013/0242073 A1* | 9/2013 | Watanabe | .......... | H04N 5/23219 348/77 |
| 2014/0044322 A1 | 2/2014 | Kumar et al. | | |

FOREIGN PATENT DOCUMENTS

| | | |
|---|---|---|
| EP | 1739391 A2 | 1/2007 |
| JP | 2000-230807 | 8/2000 |
| JP | 2007-010346 | 1/2007 |

OTHER PUBLICATIONS

Kim, Seon et al., "Robust Radiometric Calibration and Vignetting Correction", IEEE Transactions on Pattern Analysis and Machine Intelligence, IEEE Computer Society, USA, vol. 30, No. 4, Apr. 1, 2008, pp. 562-576, XP011224142.

Kang Sing Bing et al., "Can We Calibrate a Camera Using an Image of a Flat, Textureless Lambertian Surface?" In: "Lecture Notes in Computer Science", Jan. 1, 2000, Springer Berlin Heidelberg, XP055213522, vol. 1843, pp. 640-653.

(Continued)

*Primary Examiner* — Daniel Mariam
(74) *Attorney, Agent, or Firm* — Fujitsu Patent Center

(57) ABSTRACT

An image processing apparatus includes a light source to irradiate light on an object, an imaging device to capture the object, a luminance computing unit to compute a luminance at a plurality of positions on the object, and a coefficient computing unit. The coefficient computing unit computes a correction coefficient for each of the plurality of positions, according to a distance from the light source to each of the plurality of positions and the luminance at each of the plurality of positions.

18 Claims, 11 Drawing Sheets

(56) References Cited

OTHER PUBLICATIONS

Extended European Search Report dated Nov. 4, 2015 for corresponding European Patent Application No. 15150619.3, 7 pages.
R. Kimmel et al., "Global Shape from Shading", IEEE: Image Understanding, pp. 120-125, 1994 (6 pages).
R. Zhang et al., "Shape from Shading: A Survey", IEEE Transactions on Pattern Analysis and Machine Intelligence, vol. 21, No. 8, pp. 690-706, Aug. 1999 (17 pages).
E. Prados et al., "Shape from Shading: a well-posed problem?", INRIA, No. 5297, pp. 1-55, Aug. 2004 (57 pages).
University of Tokyo Press, "New Edition Image Analysis Handbook", pp. 118-131, Sep. 2004 (9 pages), with partial English translation.

\* cited by examiner

IMAGE PROCESSING APPARATUS, BIOMETRIC AUTHENTICATION APPARATUS, AND IMAGE PROCESSING APPARATUS

CROSS-REFERENCE TO RELATED APPLICATIONS

This application is based upon and claims the benefit of priority of the prior Japanese Patent Application No. 2014-046939, filed on Mar. 10, 2014, the entire contents of which are incorporated herein by reference.

FIELD

The embodiments discussed herein are related to an image processing apparatus, a biometric authentication apparatus, an image processing method, a program, and a computer-readable storage medium having stored therein such a program.

BACKGROUND

For example, when capturing biometric data to be registered in biometric authentication using human palm vein, a position of a hand, which is an example of a capturing target, is guided by a known guiding member or the like. On the other hand, when capturing biometric data to be matched with the registered biometric data, there are cases in which no guide member is provided to guide the position of the hand. When capturing the biometric data of the hand that is not guided by the guide member, a difference between the registered biometric data and the matching biometric data becomes large due to differences in the hand positions, and a success rate of personal identification (or identify verification) may deteriorate. The personal identification is regarded to be successful when a person is correctly authenticated as being that person by the authentication.

An orientation (or attitude) of the hand, such as an inclination of the hand, may be measured, in order to process the biometric data that is captured when matching the captured biometric data with the registered biometric data, so that a deviation of the hand position at the time of the matching from the hand position at the time of the registration is minimized. In this case, the success rate of the personal identification may be improved. The hand position may be detected using a plurality of distance sensors (or range finders), by measuring a distance from each of the distance sensors to a corresponding part of the hand. However, in order to improve the distance measuring accuracy, it is necessary to use a large number of distance sensors, which results in increased cost and increased size of the biometric authentication apparatus. Further, in a case in which there are physical restrictions to the size or the like of the biometric authentication apparatus, it is difficult to arrange the large number of distance sensors within a tolerable range of the physical restrictions.

On the other hand, an SFS (Shape From Shading) technique is known, which recognizes a three-dimensional shape of the capturing target from a luminance distribution of an image of the capturing target captured by irradiating light on the capturing target. When this SFS technique is applied to the detection of the hand position, light is irradiated on the capturing target and reflected light from the capturing target is received by an imaging apparatus via a lens. As a result, the so-called vignetting occurs at the lens. In a case in which the distance from the light source to the capturing target is sufficiently long, the distances from the light source to each of the points on the capturing target may be regarded as being the same, and effects of the vignetting are relatively small. On the other hand, in the case of the biometric authentication apparatus utilizing the palm vein, for example, it is difficult to make the distance from the light source to the hand sufficiently long, due to the above described restrictions or the like, and the effects of the vignetting become relatively large depending on the hand position. For this reason, it is difficult to detect the hand position with a high accuracy using the SFS technique, and improving the matching accuracy between the matching biometric data and the registered biometric data is difficult.

Therefore, according to the conventional shape recognition using the SFS technique, it is difficult to recognize the shape of the capturing target with a high accuracy.

Examples of prior art methods and systems may be found in Japanese Laid-Open Patent Publications No. 2000-230807 and No. 2007-010346, R. Kimmel et al., "Global Shape from Shading", CVGIP: Image Understanding, pp. 120-125, 1995, R. Zhang et al., "Shape from Shading: A Survey", IEEE PAMI (Transactions on Pattern Analysis and Machine Intelligence), Vol. 21, No. 8, pp. 690-706, August 1999, E. Prados et al., "Shape from Shading: a well-posed problem?", INRIA, No. 5297, pp. 1-55, August 2004, and "New Edition Image Analysis Handbook", University of Tokyo Press, pp. 118-131, September 2004.

SUMMARY

Accordingly, it is an object in one aspect of the embodiment to provide an image processing apparatus, a biometric authentication apparatus, an image processing method, a program, and a computer-readable storage medium, which can recognize the shape of a capturing target with a high accuracy.

According to one aspect of an embodiment, an image processing apparatus includes a light source configured to irradiate light on an object; an imaging device configured to capture the object; a luminance computing unit configured to compute a luminance at a plurality of positions on the object; and a coefficient computing unit configured to compute a correction coefficient for each of the plurality of positions, according to a distance from the light source to each of the plurality of positions and the luminance at each of the plurality of positions.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
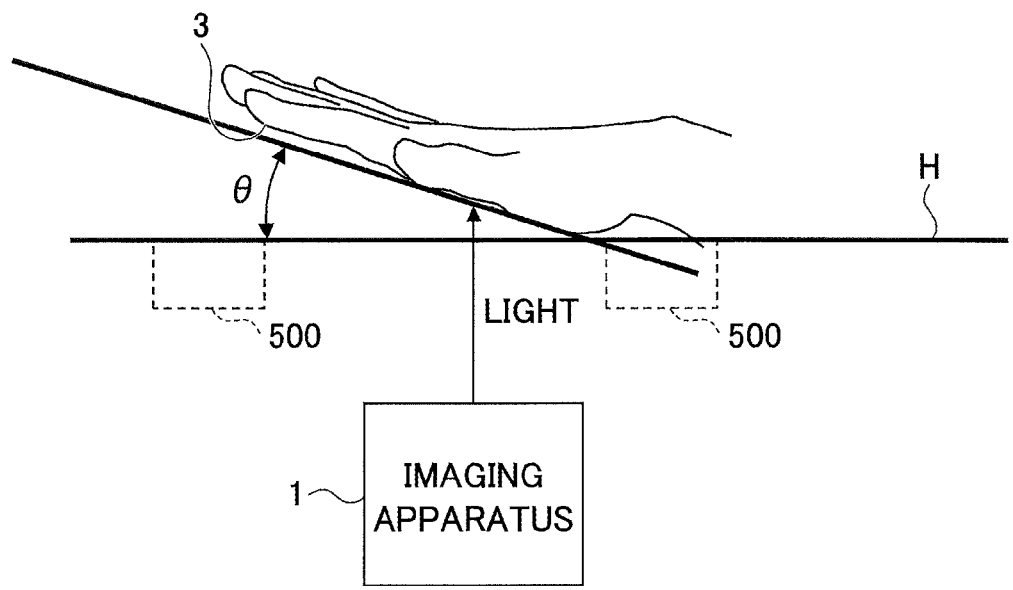
FIG. 1 is a diagram for explaining an example of a process to estimate an inclination of a palm.

Preferred embodiments of the present invention will be described with reference to the accompanying drawings.

In an image processing apparatus, an image processing method, or a computer-readable storage medium according to one aspect of the present disclosure, an imaging device captures an object that is irradiated with light from a light source, a luminance computing unit computes a luminance at a plurality of positions on the object, and a coefficient computing unit computes a correction coefficient for each of the plurality of positions, according to a distance from the light source to each of the plurality of positions and the luminance at each of the plurality of positions.

In a biometric authentication apparatus or a computer-readable storage medium according to another aspect of the present disclosure, an imaging device captures an image of a biometric target irradiated with light, a luminance computing unit computes a luminance at each of a plurality of positions within the image, a storage unit stores a correction coefficient, for each of the plurality of positions within the image, according to a distance from a light source that irradiates light on a reference object to each of a plurality of positions on the reference object corresponding to the plurality of positions within the image, and the luminance at each of the plurality of positions on the reference object, and a luminance correction unit corrects the luminance at each of the plurality of positions within the image, based on the correction coefficient at each of the plurality of positions within the image.

A description will now be given of the image processing apparatus, the biometric authentication apparatus, the image processing method, the program, and the computer-readable storage medium in each embodiment according to the present invention.

An illumination intensity of light irradiated from a light source is determined depending on a distance from the light source to a capturing target. Hence, in one embodiment, this dependency is utilized to obtain a correction coefficient according to a luminance value and the distance from the light source, for each of a plurality of positions on the capturing target where the luminance is measured. A reference object may be captured in advance, and the correction coefficient according to the luminance value and the distance from the light source may be obtained and stored in advance, for each of coordinate positions within a captured image of the reference object. The reference object is an example of a planar body that is used as a reference, which may be a piece of white paper, for example. An example of the biometrics (or biometric target) that becomes the capturing target may be a palm of a user. In a case in which the palm is captured, the luminance values are corrected based on the correction coefficients that are stored in advance according to the coordinate positions, for each of the coordinate positions within the captured image of the palm.

FIG. 1 is a diagram for explaining an example of a process to estimate an inclination of the palm, for a biometric authentication utilizing the palm vein. In FIG. 1, an imaging apparatus 1 may have a known configuration including a light source, an imaging device (or image sensor), a lens, or the like. The light from the light source irradiates a user's palm 3, which is an example of the biometrics that becomes the capturing target. The light reflected from the palm 3 is received by the imaging device via the lens, and a captured image of the palm 3 is output from the imaging device. FIG. 1 illustrates an example in which the palm 3 has an inclination angle θ with respect to a horizontal line H that is perpendicular to an optical axis of the imaging apparatus 1 (that is, optical axes of the light source and the imaging device).

A three-dimensional shape of the palm 3 may be measured from a luminance value (that is, brightness) of the captured image output from the imaging device, using the SFS technique. More particularly, the three-dimensional shape of the palm 3 may be measured by computing the distance from the light source to the palm 3 based on the luminance value of the captured image. Examples of the computing process used by the SFS technique are described in R. Kimmel et al., "Global Shape from Shading", CVGIP: Image Understanding, pp. 120-125, 1995, R. Zhang et al., "Shape from Shading: A Survey", IEEE PAMI (Transactions on Pattern Analysis and Machine Intelligence), Vol. 21, No. 8, pp. 690-706, August 1999, E. Prados et al., "Shape from Shading: a well-posed problem?", INRIA, No. 5297, pp. 1-55, August 2004, and "New Edition Image Analysis Handbook", University of Tokyo Press, pp. 118-132, September 2004 referred above, for example.

Ideal conditions are preconditions of the computing process used by the SFS technique. However, in the imaging apparatus 1 that is actually used for the biometric authentication, divergence from the ideal conditions exists due to the following first and second factors. The first factor is that, when the distance from the light source to the palm 3, which is an example of the capturing target, is denoted by D, the illumination intensity is proportional to $1/D^2$ in a case in which the light source is a point light source, but the illumination intensity is not necessarily proportional to $1/D^2$ in the case of the light source that is actually used. The second factor is that, although vignetting caused by the lens exists in the imaging apparatus 1, such vignetting is not taken into consideration under the ideal conditions.

The effects caused by the second factor described above become large particularly in a near-field optical system in which the distance between the imaging apparatus 1 and the capturing target is relatively short. In other words, in the near-field optical system, an angle of view of the lens is wide, and the effects of the vignetting become large. In addition, when the distance between the imaging apparatus 1 and the capturing target is relatively long, the light source may be approximated by the point light source, however, in the case of the near-field optical system, the luminance value shows a distance dependency different from that of a point light source model due to the following factors or the like.

Figure 2:
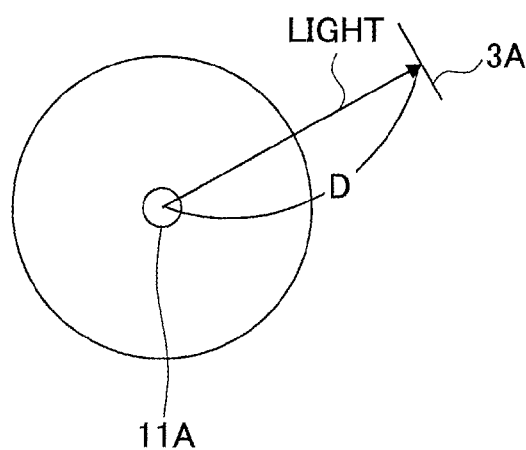
FIG. 2 is a diagram for explaining an example of a point light source model.

FIG. 2 is a diagram for explaining an example of the point light source model. In FIG. 2, light from a point light source 11A irradiates a capturing target 3A such as the palm. In FIG. 2, D denotes the distance from the point light source 11A to the capturing target 3A. In this case, an illumination intensity $L_i$ on the capturing target 3A is proportional to $1/D^2$. However, as will be described later in conjunction with FIG. 3, the light source that is actually used is not the point light source 11A described above, and the illumination intensity $L_i$ on the capturing target 3A does not necessarily become proportional to $1/D^2$.

Figure 3:
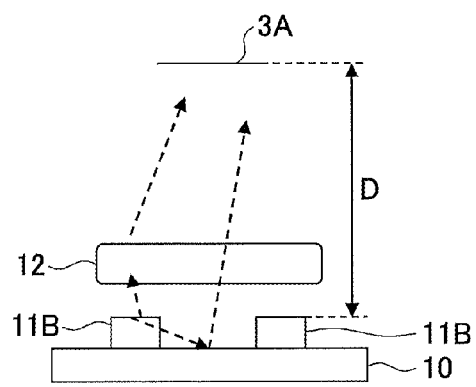
FIG. 3 is a diagram for explaining an example in which a light source includes a plurality of light emitting elements.

FIG. 3 is a diagram for explaining an example in which the light source includes a plurality of light emitting elements. In FIG. 3, the light source includes a substrate 10, a plurality of LEDs (Light Emitting Diodes) 11B which are examples of light emitting elements provided on the substrate 10, and a light guide 112 provided above the plurality of LEDs 11B. Light from the plurality of LEDs 11B is irradiated on the capturing target 3A through the light guide 12 so as to make the distribution of the illumination intensity $L_i$ uniform. In FIG. 3, arrows indicated by a dotted line represent internally reflected light caused by components or the like of the imaging apparatus, amongst the light from the plurality of LEDs 11B. In a case in which the light source includes the plurality of LEDs 11B and the light guide 12 and the internally reflected light caused by the components or the like of the imaging apparatus exists, the point light source model does not apply to the light source. Accordingly, in the actual imaging apparatus, the illumination intensity is not necessarily proportional to $1/D^2$.

For the above described reasons, in the near-field optical system, the distance from the light source to the capturing target cannot be computed accurately based on an SFS computation model which assumes the ideal conditions. For example, in the biometric authentication utilizing the vein of the palm 3, even when the SFS computation model is applied directly to the captured image of the palm 3 captured by the imaging apparatus, the computed distance from the light source to the palm 3 is greatly diverged from the correct distance (that is, the actual distance). This is because, when performing the biometric authentication, it is generally easier for the user to use the biometric authentication apparatus in the case in which the distance (or authentication distance) between the palm 3 and the imaging device is short. As a result, in the biometric authentication utilizing the vein of the palm 3, the authentication distance of approximately 5 cm, for example, is assumed, and the divergence from the ideal conditions is large. According to the SFS technique, the distance is measured based on the luminance value, and it is preferable to subject the luminance value to a suitable correction process in order to accurately measure the three-dimensional shape of the palm 3.

In one embodiment, a luminance correction process described hereunder is performed. The luminance correction process includes two kinds, namely, a basic correction process and a height variable correction process, depending on the preconditions.

Figure 4:
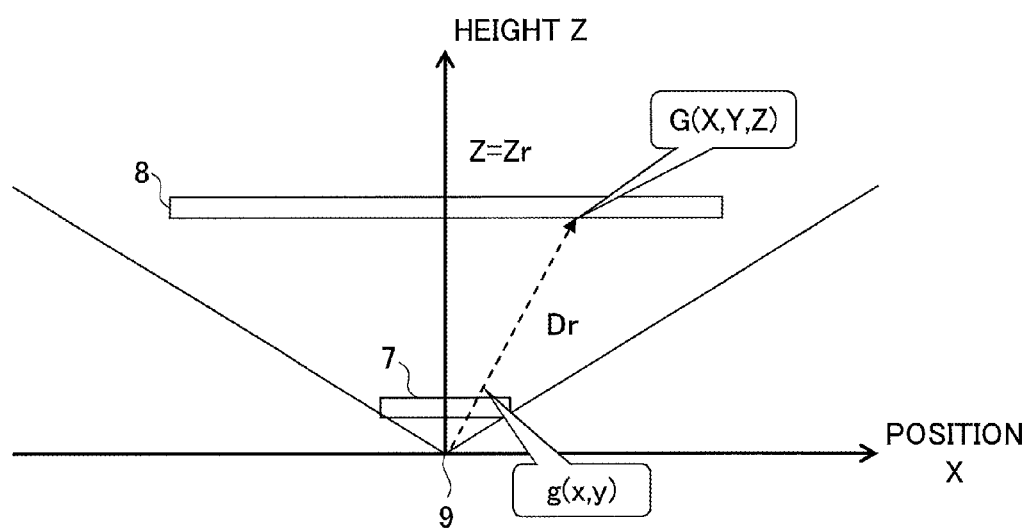
FIG. 4 is a diagram for explaining an example of an optical system.

First, a description will be given of the basic correction process, by referring to FIG. 4. FIG. 4 is a diagram for explaining an example of the optical system, and the illustration of the lens of the imaging apparatus is omitted for the sake of convenience. In this example, the basic correction process which corrects the captured image so as to suit the SFS computation model is applied to the luminance correction process. More particularly, the luminance value of the captured image of a reference object 8, arranged at a predetermined height (that is, a distance along a Z-axis direction) $Z=Z_r$ from an imaging device 7, is acquired in advance, and the luminance value of the captured image of this reference object 8 is used as a reference to correct the luminance value of the captured image of the capturing target. In other words, the luminance value of the captured image of the capturing target is corrected using the luminance value of the captured image of the reference object 8 the optical conditions of which are known. The height $Z_r$ of the reference object 8 in a XYZ coordinate system is set to a reference height along the Z-axis direction assumed (or anticipated) by the imaging apparatus that is provided on an XY-plane and irradiates light in the Z-axis direction. In addition, the reference object 8 is a planar body, used as a reference, the reflectivity of which is known in advance.

The image of the planar reference object 8 arranged at the position having the height $Z=Z_r$ from the imaging device 7 is captured, and is utilized for the luminance correction process. In the example described hereunder, the reference object 8 is arranged horizontally (that is, parallel to the XY-plane) at the height $Z=Z_r$ from the imaging device 7, however, the arrangement of the reference object 8 is not limited to the horizontal arrangement. The reflectivity of the reference object 8 is preferably 100%, however, the reflectivity may be corrected prior to being used when not 100%, as long as the reflectivity of the entire reference object 8 is constant and known. In addition, the reference object 8 preferably has a characteristic with low specular reflection. The reference object 8 may be formed by a standard reflector, treated plastic, paper, or the like, for example.

In the example illustrated in FIG. 4, the optical system is arranged in the three-dimensional XYZ coordinate system, and a center 9 of the light source of the imaging apparatus and the lens is located at a center (0, 0, 0) of the XYZ coordinate system. In other words, optical axes of the light source and the lens pass through the center 9. In the following description, a physical coordinate system (for example, in units of mm) representing a position on the reference object 8 is denoted by capital letters X, Y, and Z, and a coordinate system representing a position on the image captured by the imaging device 7 is denoted by small letters x and y. A focal distance of the lens is denoted by f, and a pinhole camera model is assumed for the imaging apparatus.

The reference object 8 is arranged horizontally at the height $Z=Z_r$ with respect to the imaging device 7 as illustrated in FIG. 4, and the image of the reference object 8 is captured by the imaging device 7. The luminance value of the captured image of the reference object 8 is denoted by $I_r(x)$. A subscript "r" in the luminance value $I_r(x)$ represents a reference, and x and y represent the coordinates in the captured image. (x, y) represents an XY coordinate system in which a center of the image is located at a center coordinate (0, 0). A position G(X, Y, Z) on the reference object 8, corresponding to a point g(x, y) on the captured image, can be represented by the following formulas using the focal distance f when the height Z is known.

$X=(Z/f) \cdot x$ $Y=(Z/f) \cdot y$

In the basic correction process, a correction process represented by a correction coefficient α(x, y) is performed with respect to a luminance value I(x, y) of the captured image, where $D_r$ denotes a distance from the light source to the position on the reference object 8, and P denotes a constant.

$$\alpha(x,y) = P/\{I_r(x,y) \cdot D_r^2(x,y)\}$$

A luminance value I'(x, y) of the captured image subjected to the correction process can be represented by the following formula.

$$I'(x, y) = I(x, y) \cdot \alpha(x, y)$$
$$= I(x, y) \cdot [P/\{I_r(x, y) \cdot D_r^2(x, y)\}]$$

In the formula of the correction process represented by the correction coefficient α(x, y), a coefficient $[P/\{I_r(x, y) \cdot D_r^2(x, y)\}]$ represents the vignetting for the case in which the luminance value of the reference object 8 is proportional to $(1/D^2)$. The correction coefficient α(x, y) is based on an inverse number of the coefficient $[P/\{I_r(x, y) \cdot D_r^2(x, y)\}]$, and performs the correction for the SFS computation model. In other words, the correction coefficient is proportional to an inverse of the luminance, and is proportional to the distance, from the light source to each of a plurality of positions on the capturing target, to a power of −2.

Next, a description will be given of the height variable correction process. The basic correction process described above utilizes the luminance value of the reference object 8 that is arranged at the reference height $Z_r$. The reference height $Z_r$ is a fixed value that is preset, and may be set to a standard height assumed (or anticipated) by the imaging apparatus. In other words, by performing the luminance correction process using the luminance value of the captured image of the reference object 8 that is arranged at the most frequently utilized height, the correction accuracy of the luminance value of the captured image of the capturing target can be improved.

On the other hand, in a case in which a known guide member for guiding the capturing target is not provided, for example, the height of the capturing target may vary. For example, in the biometric authentication utilizing the vein of the palm, the height of the user's palm placed above the imaging apparatus is not necessarily constant, and may vary. For this reason, a situation in which the height $Z_r$ of the fixed reference object 8 and the height Z of the palm, which is an example of the capturing target, differ, may occur frequently. In such situations, an improvement in the measuring accuracy can be expected by using an illumination intensity distribution at the height Z where the capturing target exists. The height Z of the capturing target may be acquired using a known distance measuring function that is separately provided.

An average height Z of the capturing target, such as the palm, may be acquired by the distance measuring function, and the luminance value of the reference object 8 at the height Z may be computed to be utilized by the luminance correction process described above. The luminance value of the reference object 8 at an arbitrary height Z may be computed, by storing the luminance value of the reference object 8 at a plurality of heights Z by modeling or the like. The correction accuracy can be improved by performing the luminance correction process using the computed luminance value of the reference object 8.

By performing the luminance correction process, it is possible to take into consideration the factors that are not considered by the existing SFS technique, to thereby improve the measuring accuracy of the distance from the light source to the capturing target in the case in which the SFS technique is applied. For this reason, even in a case in which the distance between the imaging apparatus and the capturing target is short (that is, the capturing target is near the imaging apparatus), it is possible to accurately measure the distance from the light source to the capturing target by applying the SFS technique. More particularly, by correcting the luminance distribution peculiar to the imaging apparatus, utilizing the luminance value of the reference object 8 that is set to the predetermined height, the distance from the light source to the capturing target can be measured with a high accuracy. In addition, the computing accuracy can be improved by adapting the luminance correction process to the ideal conditions assumed by the SFS computation model. Furthermore, by excluding the factors not considered by the general SFS technique, such as the vignetting at the lens, by the luminance correction process, it is possible to improve the distance measuring accuracy.

Moreover, in a case in which the height of the capturing target varies, an average value of the height Z of the capturing target measured by a separately provided distance measuring function may be utilized to compute the luminance value of the reference object 8 at the corresponding height Z. The luminance correction process may be performed utilizing the computed luminance value of the reference object 8 at the height Z, in order to further improve the distance measuring accuracy.

In addition, by estimating the reflectivity of the capturing target, the SFS technique can stably be applied regardless of the type of the capturing target.

Accordingly, the three-dimensional distance information can be acquired accurately by use of the SFS technique. As a result, when this acquiring of the three-dimensional distance information by use of the SFS technique is applied to the biometric authentication utilizing the vein of the palm, the accuracy of the biometric authentication can be improved. Particularly in the case of the biometric authentication using the vein of the palm, the distance between the imaging apparatus and the palm, which is an example of the capturing target, is designed to be short by taking into consideration the user's convenience. In the case in which such a contactless (or non-contacting) biometric authentication is performed using the near-field optical system, it is possible to particularly bring out the desirable effects of the improved (that is, high) distance measuring accuracy described above.

Figure 5:
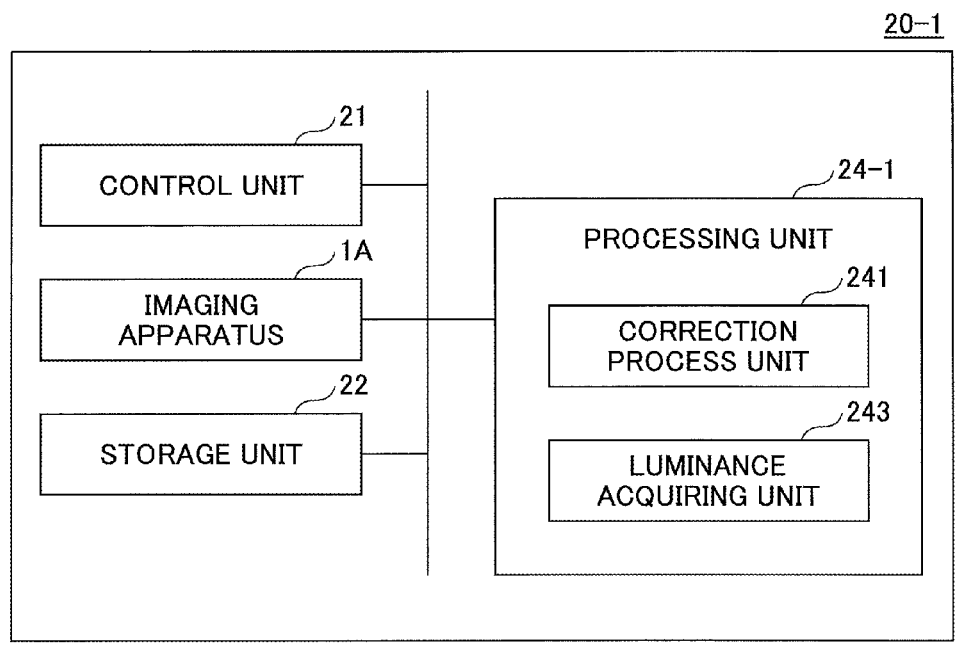
FIG. 5 is a block diagram illustrating an example of an image processing apparatus in a first embodiment.

Next, a description will be given of a first embodiment using the basic correction process described above. FIG. 5 is a block diagram illustrating an example of an image processing apparatus in the first embodiment. In this embodiment, an example is described in which the biometric authentication utilizing the vein of the palm is performed using a known guide member that guides the palm. When the guide member is used to guide the palm, it is possible to maintain the distance between the imaging device and the palm approximately constant. For this reason, the luminance correction process described hereinafter utilizes the correction coefficient that is computed from the captured image of the reference object located at a predetermined distance from the imaging device.

An image processing apparatus 20-1 includes a control unit 21, an imaging apparatus 1A, a storage unit 22, and a processing unit 24-1 that are connected as illustrated in FIG.

5. The processing unit 24-1 includes a correction process unit 241 and a luminance acquiring unit 243.

The control unit 21 controls the entire image processing apparatus 20-1. The control unit 21 may be formed by any suitable processor (or computer), including a CPU (Central Processing Unit).

The imaging apparatus 1A includes an illuminating optical system that irradiates light on the capturing target guided by the known guide member (not illustrated), and an imaging optical system that receives reflected light from the capturing target. In a case in which the guide member guides the palm 3, which is an example of the capturing target, so that the palm 3 becomes parallel to the horizontal line H in FIG. 1, the guide member may be formed by a transparent plate that guides a horizontal surface of the palm 3 parallel to the horizontal line H, or by a flange 500 that guides only outer peripheral parts of the palm 3, or the like, for example.

Figure 6A:
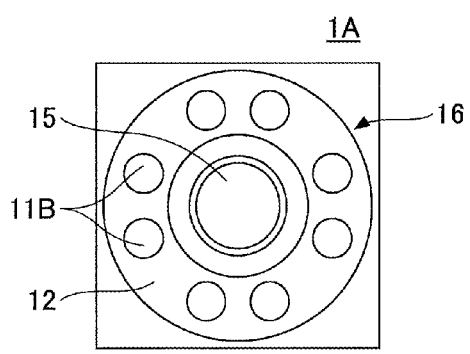
FIGS. 6A and 6B are diagrams for explaining a first example of an imaging apparatus.
Figure 6B:
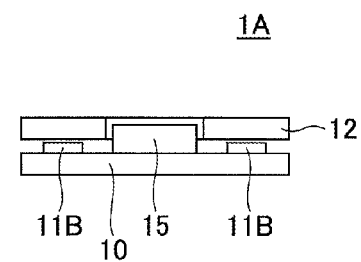

FIGS. 6A and 6B are diagrams for explaining a first example of the imaging apparatus. FIG. 6A is a plan view of the imaging apparatus 1A, and FIG. 6B is a schematic side view of the imaging apparatus 1A. The imaging apparatus 1A includes an imaging optical system 15 such as a camera, and an illuminating optical system 16. The imaging optical system 15 includes the imaging device 7 illustrated in FIG. 4, a lens (not illustrated), or the like. The illuminating optical system 16 includes a plurality of (8 in this example) LEDs 11B, and a light guide 12. In this example, the LEDs 11B are arranged in a ring-shaped on an outer side of the imaging optical system 15, as illustrated in FIG. 6A. The light guide 12 has a ring-shape covering each of the LEDs 11B. When the biometric authentication utilizes the vein of the palm 3, the LEDs 11B may emit light in a wavelength band that may be regarded as monochromatic (or single color).

The storage unit 22 stores data, such as various parameters and image data. The storage unit 22 may be formed by a semiconductor memory device, a magnetic storage unit, or the like. The storage unit 22 may store one or more programs to be executed by the processor that forms the control unit 21. The storage unit 22 that stores one or more programs may be formed by any suitable non-transitory computer-readable storage medium.

The processing unit 24-1 performs a normalization process on the capturing target. The processing unit 24-1 may be formed by any suitable processor (or computer), including a CPU. The processing unit 24-1 includes the correction process unit 241 and the luminance acquiring unit 243. The storage unit 22 may store one or more programs to be executed by the processor that forms the processing unit 24-1.

In an example of an image processing method in this first embodiment, the image processing unit 20-1 illustrated in FIG. 5 is used to capture, by the imaging apparatus 1A, the reference object 8 that is arranged at the position having the height $Z=Z_r$ by utilizing the guide member. The image data of the luminance value I(x, y) of the captured image is stored in the storage unit 22 under the control of the control unit 21.

The luminance acquiring unit 243 of the processing unit 24-1 is an example of a luminance computing unit (or luminance computing means) that computes and stores in the storage unit 22, the luminance value at each position on the reference object 8, based on the image data of the luminance value I(x, y) of the captured image stored in the storage unit 22, under the control of the control unit 21. The correction process unit 241 of the processing unit 24-1 is an example of a coefficient computing unit (or coefficient computing means) that computes and stores, in the storage unit 22, the correction coefficient α(x, y) with respect to the luminance value I(x, y) of the captured image, under the control of the control unit 21, for performing the correction process represented by the following formula described above.

$$\alpha(x,y)=P/\{I_r(x,y)\cdot D_r^2(x,y)\}$$

The correction process unit 241 may further compute and store, in the storage unit 22, the luminance value I'(x, y) by performing the correction process represented by the following formula described above with respect to the luminance value I(x, y) of the captured image, under the control of the control unit 21.

$$I'(x, y) = I(x, y) \cdot \alpha(x, y)$$
$$= I(x, y) \cdot [P/\{I_r(x, y) \cdot D_r^2(x, y)\}]$$

In a case in which a mechanism is provided to enable the reference object 8 to be arranged at the position having the height $Z=Z_r$, it is unnecessary to provide the guide member described above on the image processing apparatus 20-1, and the guide member may be provided on a biometric authentication apparatus 20-2 which will be described later in conjunction with FIG. 7.

Figure 7:
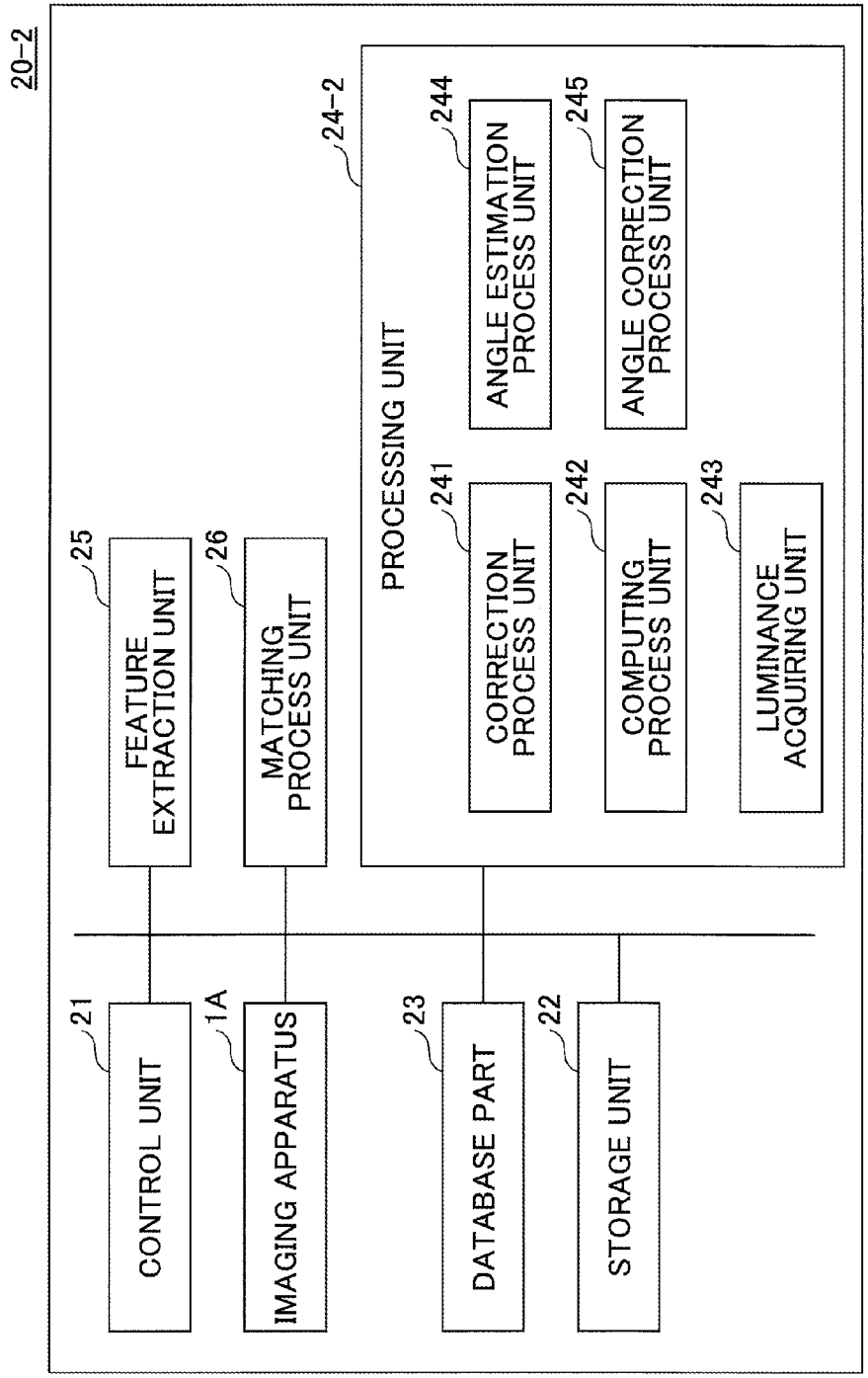
FIG. 7 is a block diagram illustrating an example of a biometric authentication apparatus in the first embodiment.

FIG. 7 is a block diagram illustrating an example of the biometric authentication apparatus in the first embodiment. In FIG. 7, those parts that are the same as those corresponding parts in FIG. 5 are designated by the same reference numerals, and a description thereof will be omitted. The biometric authentication apparatus 20-2 illustrated in FIG. 7 may be used when registering biometric data (in this example, the vein of the palm 3) of the user, and when matching the biometric data of the user with registered biometric data.

The biometric authentication apparatus 20-2 includes a control unit 21, an imaging apparatus 1A, a storage unit 22, a database part 23, a processing unit 24-2, a feature extraction unit 25, and a matching process unit 26 that are connected as illustrated in FIG. 7. The processing unit 24-2 includes a correction process unit 241, a computing process unit 242, a luminance acquiring unit 243, an angle estimation process unit 244, and an angle correction process unit 245. The storage unit 22 may store one or more programs to be executed by a processor that forms the processing unit 24-2.

When registering the biometric data of the user, the user places the palm 3 at the position guided by the guide member. The imaging apparatus 1A, under the control of the control unit 21, captures the image of the vein of the palm 3, and stores the registering image data of the captured image in the storage unit 22. The feature extraction unit 25, under the control of the control unit 21, extracts feature data to be used for the biometric authentication, by a known method, from the registering image data of the captured image of the vein of the palm 3 stored in the storage unit 22, and registers the extracted feature data in the database part 23. The database part 23 may be formed by a part of the storage unit 22.

When matching the biometric data of the user with the registered biometric data, the user places the palm 3 at the position guided by the guide member. The imaging apparatus 1A, under the control of the control unit 21, captures the image of the vein of the palm 3, and stores in the storage unit 22 the matching image data of the captured image to be matched (or collated) with the registered biometric data.

The processing unit 24-2 performs a normalization process with respect to the matching image data of the captured image stored in the storage unit 22. This normalization process computes three-dimensional orientation information of the image data, and normalizes the orientation (or attitude) of the palm 3, that is, corrects the orientation of the palm 3 to the correct orientation. The correct orientation of the palm 3 refers to the orientation of the palm 3 at the time when the biometric data of the user is registered.

In the processing unit 24-2, the luminance acquiring unit 243 acquires the luminance value of the reference object 8 at the height $Z=Z_r$ and stored in the storage unit 22. The luminance acquiring unit 243 may provide, if necessary, the image data of the captured image of the reference object 8 at the height $Z=Z_r$ and stored in the storage unit 22. Of course, the image data of the reference object 8 may be subjected to an image processing, such as compression or the like, prior to being stored in the storage unit 22.

The correction process unit 241 corrects the luminance value at each coordinate point (x, y) of the matching image data stored in the storage unit 22, based on the correction coefficient $\alpha(x, y)$ that is computed and stored in the storage unit 22 as described above, and stores the corrected luminance value in the storage unit 22. The computing process unit 242 performs a computation based on the SFS computation model, using the image data of the corrected luminance value at the pixel (x, y) of each coordinate point, and obtains SFS information including the distance from the light source of the imaging apparatus 1A to the pixel (x, y) at each coordinate point. A computing method of the computation based on the SFS computation model is not limited to a particular method, and for example, it is possible to use the method described in E. Prados et al., "Shape from Shading: a well-posed problem?", INRIA, No. 5297, pp. 1-55, August 2004, and "New Edition Image Analysis Handbook", University of Tokyo Press, pp. 118-132, September 2004 referred above.

The angle estimation process unit 244 is an example of an angle computing unit that computes the inclination angle of the palm 3, which is an example of the matching capturing target, with respect to a reference surface of the palm 3, based on the SFS information obtained by the correction process unit 241. For example, the reference surface of the palm 3 is the horizontal surface parallel to the horizontal line H in the case of the example illustrated in FIG. 1. A more detailed description of the computing of the inclination angle with respect to the reference surface of the palm 3 will be given later in the specification.

The angle correction process unit 245 is an example of an angle correction unit (or angle correction means) that corrects the matching image data stored in the storage unit 22, based on the inclination angle of the palm 3 with respect to the reference surface of the palm 3 computed by the angle estimation process unit 244. A more detailed description of the correction of the matching image data will be given later in the specification. Hence, the matching image data of the palm 3 that is captured at an orientation inclined with respect to the reference surface, is corrected into the matching image data of the palm 3 that is captured at the correct orientation parallel to the reference surface. The correction method (or rotation method) to correct (or rotate) the matching image data is not limited to a particular method, and for example, it is possible to use the method described in "New Edition Image Analysis Handbook", University of Tokyo Press, pp. 118-132, September 2004 referred above. Even when the registering image data is captured at an orientation inclined with respect to the reference surface, the matching image data can be corrected to the image data at an orientation identical to the orientation at which the registering image data is captured, because the height of the palm 3 is maintained approximately constant by the guide member. The corrected matching image data is stored in the storage unit 22 under the control of the control unit 21.

The feature extraction unit 25 extracts, by a known method, the feature data to be used for the biometric authentication, from the corrected matching image data stored in the storage unit 22, and stores the extracted feature data in the storage unit 22, under the control of the control unit 21. The matching process unit 26 matches, under the control of the control unit 21, the feature data of the corrected matching image data stored in the storage unit 22 with the feature data of the registered image data registered in the database part 23, and stores a result of the matching (hereinafter also referred to as a "matching result") in the storage unit 22. For example, the matching result represents a similarity of the feature data of the corrected matching image data with respect to the feature data of the registered image data.

Figure 8:
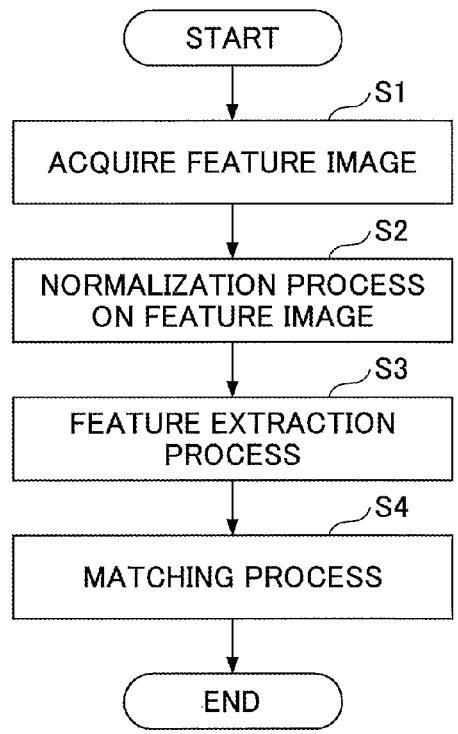
FIG. 8 is a flow chart for explaining an example of an authentication process.

FIG. 8 is a flow chart for explaining an example of an authentication process of the biometric authentication apparatus 20-2. When starting the authentication process, the user places the palm 3 at the position guided by the guiding member of the biometric authentication apparatus 20-2. In FIG. 8, the control unit 21 in step S1 controls the imaging apparatus 1A to perform a feature image acquiring process, in order to acquire a feature image by the imaging apparatus 1A and store the feature image in the storage unit 22. In this example, the feature image refers to the image of the vein of the palm 3. Accordingly, in this example, the matching image data of the captured image captured by the imaging apparatus 1A is the feature image acquired by the feature image acquiring process.

The control unit 21 in step S2 controls the processing unit 24-2 to perform a normalization process that normalizes the feature image, in order to acquire the three-dimensional orientation information of the palm 3, and store in the storage unit 22 the feature image of the correct orientation by correcting the orientation of the palm 3 based on the three-dimensional orientation information, by the processing unit 24-2. A more detailed description of the normalization process will be given later in the specification in conjunction with FIGS. 9 and 10.

The processing unit 21 in step S3 controls the feature extraction unit 25 to perform a feature extraction process, in order to extract by a known method and store in the storage unit 22, the feature data to be used for the biometric authentication from the feature image of the corrected orientation, by the feature extraction unit 25.

The processing unit 21 in step S4 controls the matching process unit 26 to perform a matching process, in order to acquire and store in the storage unit 22 the matching result of matching the feature data extracted from the feature image of the corrected orientation with the feature data of the registered feature image registered in the database part 23, by the matching process unit 26.

The authentication process that matches the biometric data of the user with the registered biometric data is as illustrated in FIG. 8 described above. However, a registration process to register the biometric data of the user may be performed by omitting step S4 of the authentication process described above, and storing the feature data of the feature image extracted in step S3 into the database part 23 in place of the storage unit 22.

Figure 9:
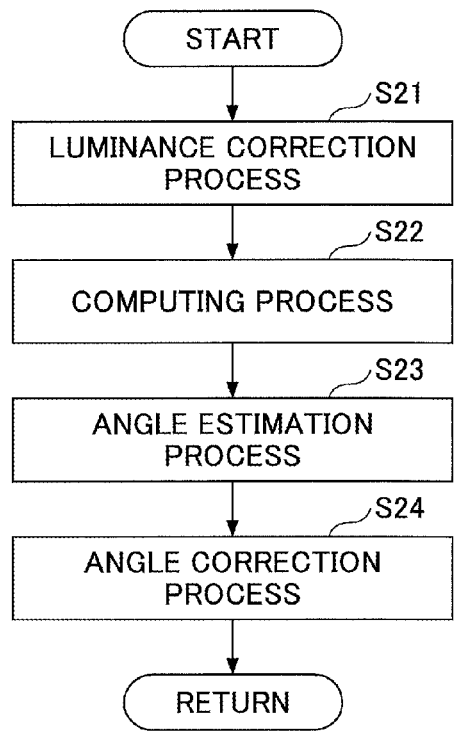
FIG. 9 is a flow chart for explaining an example of a normalization process.

FIG. 9 is a flow chart for explaining an example of the normalization process perform in step S2 illustrated in FIG. 8. In FIG. 9, the control unit 21 in step S21 controls the luminance acquiring unit 243 and the correction process unit 241 to perform the luminance correction process. In the luminance correction process, the luminance acquiring unit 243 acquires the luminance value of the reference object 8 at the height $Z=Z_r$, stored in the storage unit 22, and the correction process unit 241 corrects the luminance value of the pixel (x, y) at each coordinate point of the matching image data stored in the storage unit 22, based on the computed correction coefficient α(x, y) using the correction formula described above, and stores the corrected luminance value in the storage unit 22. In this example, when an arbitrary coefficient is denoted by h, the pixel (x, y) at each coordinate point moves in a range of (-hx, +hx) and (-hy, +hy).

Figure 10:
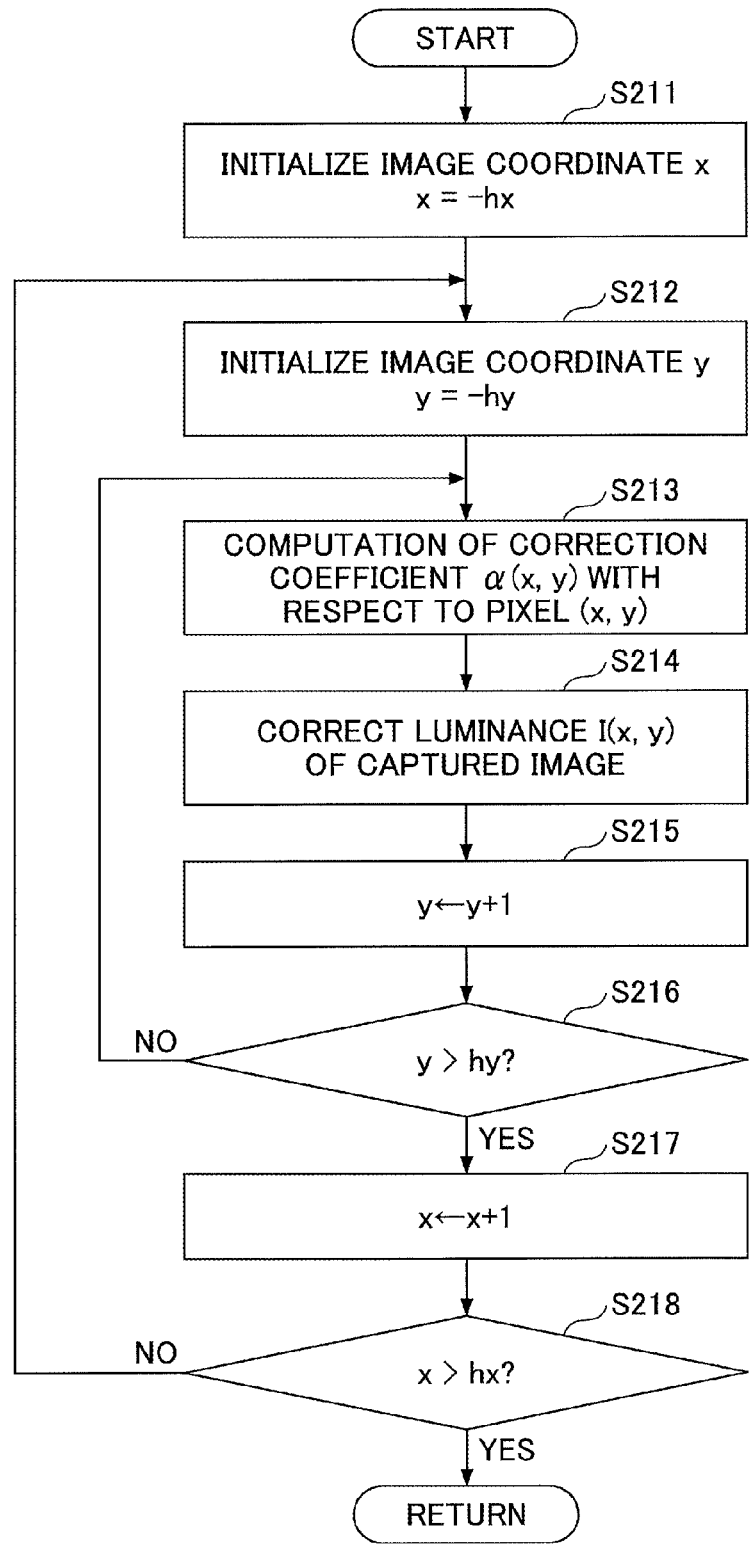
FIG. 10 is a flow chart for explaining an example of a luminance correction process.

FIG. 10 is a flow chart for explaining an example of the luminance correction process performed by step S21 in FIG. 9. In FIG. 10, the luminance acquiring unit 243 in step S211 initializes the image coordinate x to x=-hx, and the luminance acquiring unit 243 in step S212 initializes the image coordinate y to y=-hy. The correction process unit 241 in step S213 computes the correction coefficient α(x, y) with respect to the pixel (x, y). The correction unit 241 in step S214 corrects the luminance value I(x, y) of the captured image using the correction formula described above including the correction coefficient α(x, y).

The correction process unit 241 in step S215 increments y to y=y+1, and the correction process unit 241 in step S216 judges whether y>hy. The process returns to step S213 when a judgment result in step S216 is NO, and the process advances to step S217 when the judgment result in step S216 is YES. The correction process unit 241 in step S217 increments x to x=x+1, and the correction process unit 241 in step S218 judges whether x>hx. The process returns to step S212 when the judgment result in step S218 is NO, and the process returns to the process of FIG. 9 and advances to step S22 when the judgment result in step S218 is YES.

Returning now to the description of FIG. 9, the control unit 21 in step S22 controls the computing process unit 242 to perform a computing process. In this computing process, a computation based on the SFS computation model is performed, based on the luminance value I'(x, y) of the captured image subjected to the luminance correction process described above. This computing process thus obtains the SFS information including the distance from the light source of the imaging apparatus 1A to the pixel (x, y) at each coordinate point.

The control unit 21 in step S23 controls the angle estimation process unit 244 to perform an angle estimation process. In this angle estimation process, the angle estimation process unit 244 computes the inclination angle of the palm 3, which is an example of the capturing target to be matched, with respect to the reference surface of the palm 3, based on the SFS information obtained by the computing process described above. In the case of the example illustrated in FIG. 1, for example, the reference surface of the palm 3 is the horizontal surface parallel to the horizontal line H. In an example of the method of computing the inclination angle with respect to the reference surface of the palm 3, a three-dimensional data may be projected onto one dimension, and a linear fitting may be performed with respect to the one-dimensional projection. In this case, an image data (Xi, Yi, Zi) (i=0, 1, . . . and denotes an index representing a coordinate on the capturing target) of the captured image of the three-dimensional palm 3 may first be projected onto an XZ-plane, and the linear fitting may be performed to fit a linear line with respect to the projection, so as to obtain the inclination angle of the palm 3 with respect to the XZ-plane. Next, the image data (Xi, Yi, Zi) of the captured image of the three-dimensional palm 3 may next be projected onto a YZ-plane, and the linear fitting may be performed to fit a linear line with respect to the projection, so as to obtain the inclination angle of the palm 3 with respect to the YZ-plane. By obtaining the inclination angle of the palm 3 with respect to the XZ-plane and the inclination angle of the palm 3 with respect to the YZ-plane, the inclination angle of the palm 3 with respect to the reference surface of the palm 3 can be obtained. Of course, the inclination angle of the palm 3 with respect to the reference surface of the palm 3 may be obtained by directly fitting an equation of a plane to the image data (Xi, Yi, Zi) of the captured image of the three-dimensional palm 3.

The control unit 21 in step S24 controls the angle correction process unit 245 to perform an angle correction process. In the angle correction process, the angle correction process unit 245 corrects the matching image data stored in the storage unit 22, based on the inclination angle of the palm 3 with respect to the reference surface of the palm 3 computed by the angle estimation process unit 244. Accordingly, the matching image data of the palm 3 that is captured at an orientation inclined with respect to the reference surface, is corrected into the matching image data of the palm 3 that is captured at the correct orientation parallel to the reference surface. The correction (or rotation) to correct (or rotate) the matching image data may approximate the palm 3 by a plane and rotate this plane, for example. In addition, the matching image data may be corrected using a three-dimensional rotation process. The three-dimensional rotation process provides a more accurate rotation process, however, computations associated therewith increase. For this reason, in a case in which priority is placed on the high-speed computation process, the capturing target may be approximated by the plane and the plane may be rotated, in order to reduce the computations.

Figure 11:
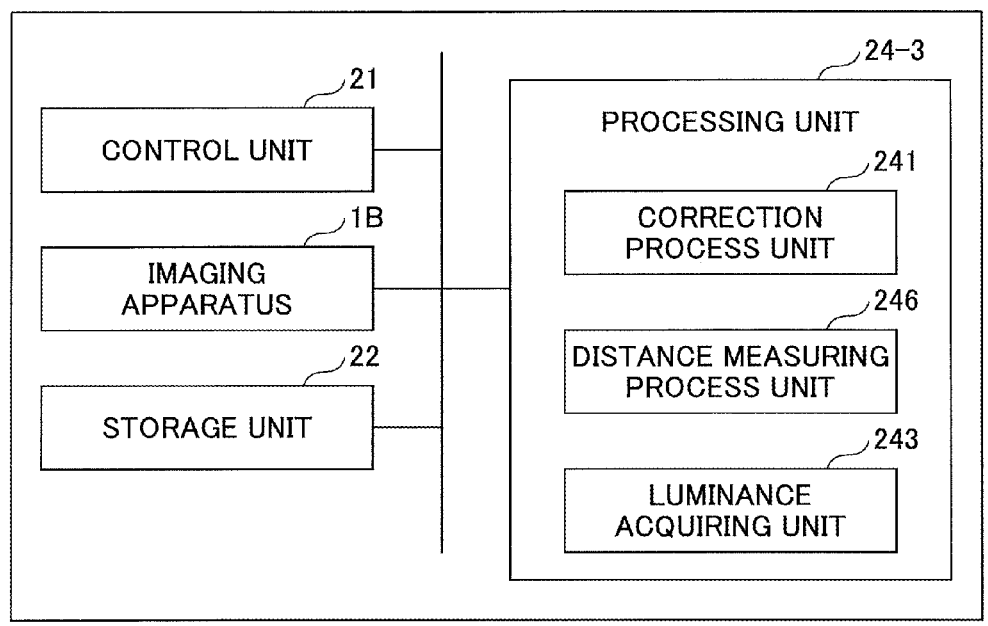
FIG. 11 is a block diagram illustrating an example of the image processing apparatus in a second embodiment.

Next, a description will be given of a second embodiment that uses the height variable correction process described above. FIG. 11 is a block diagram illustrating an example of the image processing apparatus in the second embodiment. In FIG. 11, those parts that are the same as those corresponding parts in FIG. 5 are designated by the same reference numerals, and a description thereof will be omitted.

In FIG. 11, an image processing apparatus 20-3 includes an imaging apparatus 1B and a processing unit 24-3, in place of the imaging apparatus 1A and the processing unit 24-1 of the first embodiment described above. The processing unit 24-3 includes a correction process unit 241, a luminance acquiring unit 243, and a distance measuring process unit 246. In this embodiment, no guide member is provided on the image processing apparatus 20-3, and the distance from the light source of the imaging apparatus 1B to each point on the palm 3, which is an example of the capturing target, that is, the height of the palm 3, is measured using LEDs that are provided on the imaging apparatus 1B for the distance measurement. The storage unit 22 may store one or more programs to be executed by a processor that forms the control unit 24-3.

Figure 12A:
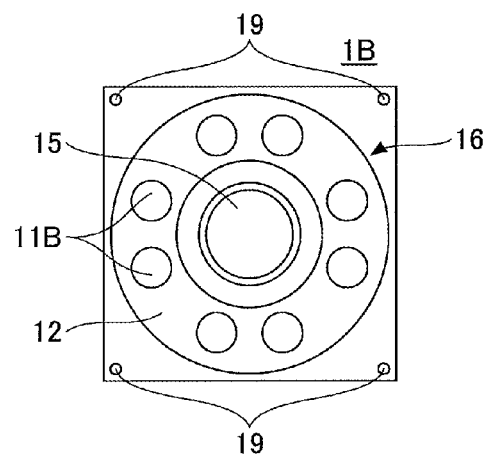
FIGS. 12A and 12B are diagrams for explaining a second example of the imaging apparatus.
Figure 12B:
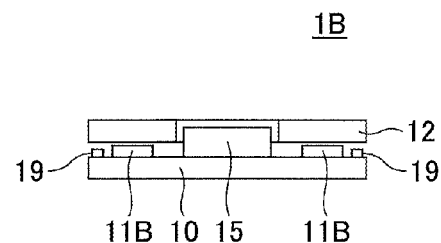

FIGS. 12A and 12B are diagrams for explaining a second example of the imaging apparatus. In FIGS. 12A and 12B, those parts that are the same as those corresponding parts in FIGS. 6A and 6B are designated by the same reference numerals, and a description thereof will be omitted. The imaging apparatus 1B includes LEDs (four LEDs in this example) 19, which are an example of a plurality of light emitting elements for the distance measurement. In this example, the LEDs 19 are arranged at four corners of the substrate 10, on the outer side of the ring-shaped light guide 12. Light emitted from the LEDs 19 is reflected by the capturing target, and the reflected light from the capturing target is received by the imaging optical system 15.

The distance measuring process unit 246 of the processing unit 24-3 is an example of a measuring unit (or measuring means) having a measuring function to measure the distance from the LEDs 19 to the capturing target by a known method, based on the reflected light from the capturing target received by the imaging optical system 15. A description of a particular distance measuring method will be given later in the specification. In the first embodiment described above, the height Z of the reference object 8 is a known value $Z_r$, because the guide member (for example, the flange 500) is provided. On the other hand, in this second embodiment in which no guide member is provided, the height Z of the reference object 8 is measured by the distance measuring process unit 246. Of course, in a case in which a mechanism is provided in this second embodiment to enable the reference object 8 to be arranged at the position having the height $Z=Z_r$, it is possible to use the imaging apparatus 1A in place of the imaging apparatus 1B.

In this second embodiment, the luminance value of the reference object 8 positioned at the same height as the capturing target is utilized for the luminance correction process. For this reason, the luminance acquiring unit 243 of the processing unit 24-3 acquires and stores in the storage unit 22, the luminance value at each position on the reference object 8 that is positioned at the height Z measured by the distance measuring process unit 246, based on the image data of the luminance value I(x, y) of the captured image stored in the storage unit 22, under the control of the control unit 21. The optical system in this case may be the same as the optical system illustrated in FIG. 4.

For example, the reference object 8 positioned at three difference heights $Z_{r0}$, $Z_{r1}$, and $Z_{r2}$ may be captured by the imaging apparatus 1B, and a fitting may be performed based on the luminance value at each of the three difference heights $Z_{r0}$, $Z_{r1}$, and $Z_{r2}$, in order to store coefficients of a computation formula of the fitting. The fitting may be represented by the following computation formula, for example.

$$I_r z(x,y) = \{A(x,y)/D_r^2\} + \{B(x,y)/D_r\} + C(x,y)$$

In the computation formula above, $I_r z(x, y)$ denotes a luminance value at the coordinate (x, y) of the reference object 8, obtained as a result of the fitting. In addition, $D_r$ denotes the distance from the light source of the imaging apparatus 1B to the reference object 8 in a case in which the reference object 8 is positioned at the height Z. Furthermore, A(x, y), B(x, y), and C(x, y) denote coefficients of the computation formula of the fitting at positions corresponding to the point (x, y) on the image. As may be seen from the computation formula above, the coefficients of the computation formula of the fitting have different values for each point (x, y) on the image.

A coordinate (X, Y, Z) of the reference object 8 corresponding to the coordinate (x, y) on the image may be obtained from the following formulas, where f denotes the focal distance of the lens of the imaging optical system 15.

$$X = (Z/f) \cdot x$$

$$Y = (Z/f) \cdot y$$

Accordingly, the distance $D_r$ from the light source to the reference object 8 may be obtained from the following formula.

$$D_r(x,y) = (X^2 + Y^2 + Z^2)^{1/2}$$

In the formula above, it is assumed that the luminance value of the reference object 8 with respect to the distance $D_r$ to the capturing target includes three terms $D_r^{-2}$, $D_r^{-1}$, and $D_r^0$ (=constant term). Under ideal conditions of the point light source model, for example, only the term $D_r^{-2}$ is valid. However, in the actual imaging apparatus 1B, not all terms can be represented by the term $D_r^{-2}$, and thus, the computation is performed by also including the coefficients B and C.

Next, a description will be given of a procedure to compute the coefficients A, B, and C in a case in which the point (x, y) on the image is targeted. Luminance values $I_r z_0(x, y)$, $I_r z_1(x, y)$, and $I_r z_2(x, y)$ of the reference object 8 positioned at the three difference heights $Z_{r0}$, $Z_{r1}$, and $Z_{r2}$ may be computed based on the following formulas.

$$\begin{cases} I_{r,Z_0}(x, y) = \dfrac{A(x, y)}{D_0^2} + \dfrac{B(x, y)}{D_0} + C(x, y) \\ I_{r,Z_1}(x, y) = \dfrac{A(x, y)}{D_1^2} + \dfrac{B(x, y)}{D_1} + C(x, y) \\ I_{r,Z_2}(x, y) = \dfrac{A(x, y)}{D_2^2} + \dfrac{B(x, y)}{D_2} + C(x, y) \end{cases}$$

In the formulas above, $D_0$, $D_1$, and $D_2$ denote the distances from the light source to the reference object 8 at the three difference heights $Z_{r0}$, $Z_{r1}$, and $Z_{r2}$, respectively. When the coordinate (x, y) on the image and the focal distance f of the lens of the imaging optical system 15 in the imaging apparatus 1B are determined, these distances $D_0$, $D_1$, and $D_2$ can be computed by applying the height $Z_r$. For this reason, the formulas above are three simultaneous equations with respect to the three unknown variables (A, B, C), and the coefficients A, B, and C can be obtained by solving the three simultaneous equations.

Figure 13:
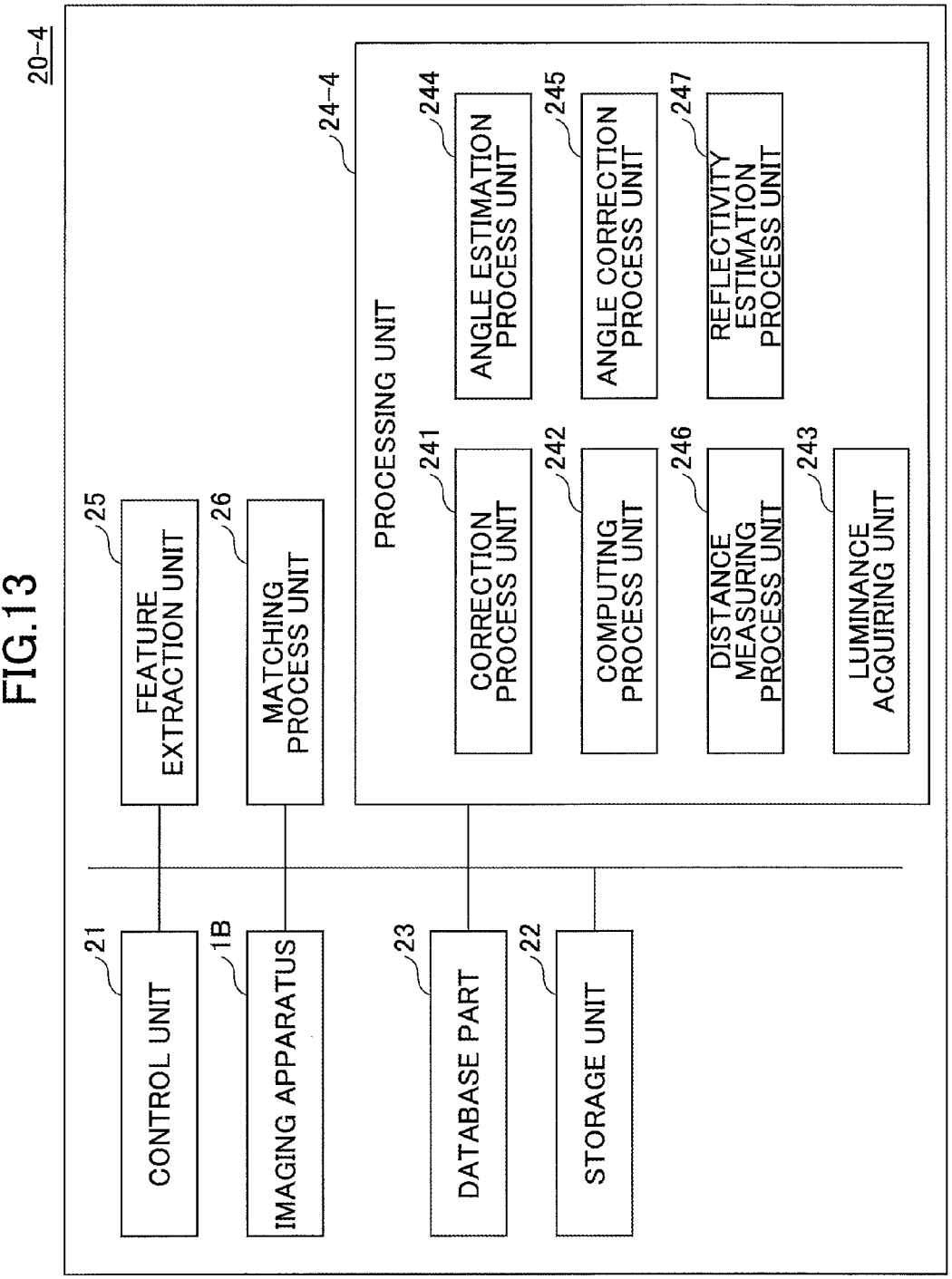
FIG. 13 is a block diagram illustrating an example of the biometric authentication apparatus in the second embodiment.

FIG. 13 is a block diagram illustrating an example of the biometric authentication apparatus in the second embodiment. In FIG. 13, those parts that are the same as those corresponding parts in FIGS. 7 and 11 are designated by the same reference numerals, and a description thereof will be omitted. A biometric authentication apparatus 20-4 illustrated in FIG. 13 may be used when registering biometric data (in this example, the vein of the palm 3) of the user, and when matching the biometric data of the user with registered biometric data.

A processing unit 24-4 of the biometric authentication apparatus 20-4 illustrated in FIG. 13 includes a reflectivity estimation process unit 247. The reflectivity estimation process unit 247 estimates the reflectivity of the capturing target by a known method. A description of the particular method of estimating the reflectivity will be given later in the specification. The storage unit 22 may store one or more programs to be executed by a processor that forms the processing unit 24-4.

An authentication process of the biometric authentication apparatus 20-4 is basically similar to the authentication process illustrated in FIG. 8. However, when starting the authentication process, the user places the palm 3 within a predetermined region of the biometric authentication apparatus 20-4 because no guide member is provided. The imaging apparatus 1B can capture the image of the vein of the palm 3 placed within this predetermined region.

Figure 14:
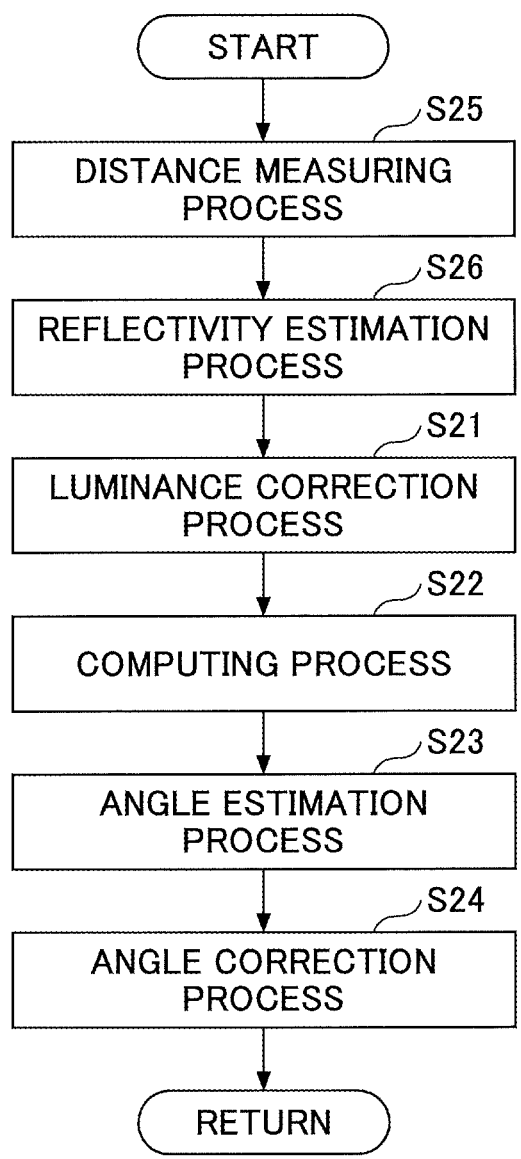
FIG. 14 is a flow chart for explaining an example of the normalization process.

FIG. 14 is a flow chart for explaining an example of the normalization process in this embodiment performed in step S2 illustrated in FIG. 8. In FIG. 14, those steps that are the same as those corresponding steps in FIG. 9 are designated by the same reference numerals, and a description thereof will be omitted. In this embodiment, the height of the capturing target is variable. Hence, the distance measuring process of step S25 is first performed, and thereafter, the reflectivity estimation process is performed to estimate the reflectivity of the capturing target. Thereafter, the luminance correction process of step S21, the computation process of step S22, the angle estimation process of step S23, and the angle correction process of step S24 are performed in a manner similar to the first embodiment described above.

In FIG. 14, the control unit 21 in step S25 controls the distance measuring process unit 246 to perform the distance measuring process. In the distance measuring process, the distance measuring process unit 246 measures the distance from the LEDs 19 to each spot on the capturing target, based on the size or the like of the spot formed on the capturing target by light beams emitted from the LEDs 19 of the imaging apparatus 1B. In this example, the LEDs 19 are provided at the same height position on the substrate 10 as the LEDs 18 which are examples of the light sources of the illuminating optical system 16, and thus, the distance measuring process unit 246 can measure the distance from the light source to the capturing target. In a case in which the capturing target is the reference object 8, it is possible to measure the distance from the light source to the reference object 8, that is, the height position of the reference object 8. In addition, in a case in which the capturing target is the user's palm 3, it is possible to measure the distance from the light source to the palm 3, that is, the height position of the palm 3.

Figure 15A:
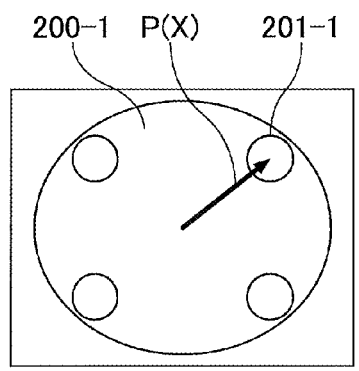
FIGS. 15A and 15B are diagrams for explaining an example of a spot light image.
Figure 15B:
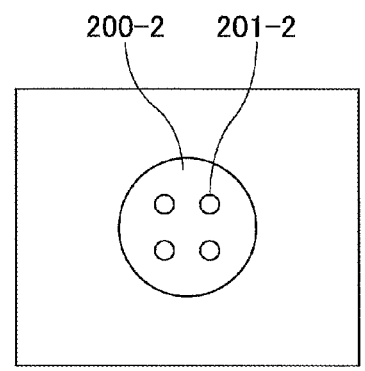

FIGS. 15A and 15B are diagrams for explaining an example of a spot light image. FIG. 15A illustrates an example of an image captured by the imaging apparatus 1B when the capturing target is at a height position $H_1$, and FIG. 15B illustrates an example of an image captured by the imaging apparatus 1B when the capturing target is at a height position $H_2$, where $H_2 > H$. In FIG. 15A, circular regions 201-1 indicate spots of the light beams from the LEDs 19 formed on the capturing target at the height position $H_1$, and an approximately circular region 200-1, including the four spots 201-1, indicate an imaging region of the capturing target at the position $H_1$ captured by the imaging apparatus 1B. Further, in FIG. 15B, circular regions 201-2 indicate spots of the light beam from the LEDs 19 formed on the capturing target at the height position $H_2$, and an approximately circular region 200-2, including the four spots 201-2, indicate an imaging region of the capturing target at the position $H_2$ captured by the imaging apparatus 1B. In addition, P(X) denotes a distance from a center of the image to the spot 201-1. This distance P(X) becomes smaller as the height position of the capturing target becomes higher, and thus, the height position of the capturing target can be computed based on this distance P(X). The size of the spot (for example, the spot diameter) of the light beam formed on the capturing target becomes smaller as the height position of the capturing target becomes higher, and the position of the spot on the capturing target becomes closer to the center of the imaging region as the height position of the capturing target becomes higher. Hence, the height position of the capturing target can be computed based on the size and the position of the spot of the light beam formed on the capturing target.

The method of measuring the height position of the capturing target is not limited to the method described above. In addition, the height position of the capturing target may be measured according to methods described in Japanese Laid-Open Patent Publications No. 2000-230807 and No. 2007-010346, for example.

In FIG. 14, the control unit 21 in step S26 controls the reflectivity estimation process unit 247 to perform the reflectivity estimation process. In the reflectivity estimation process, the reflectivity estimation process unit 247 estimates the reflectivity of the capturing target (for example, whether the capturing target is bright or dark). In the case in which the capturing target is the palm 3, for example, the reflectivity of the capturing target differs for each user. Hence, by estimating the reflectivity of the capturing target, the computation based on the SFS computation model can be performed stably, regardless of the capturing target, and it is possible to obtain the SFS information including the distance from the light source of the imaging apparatus 1B to the pixel (x, y) at each coordinate point.

Figure 16A:
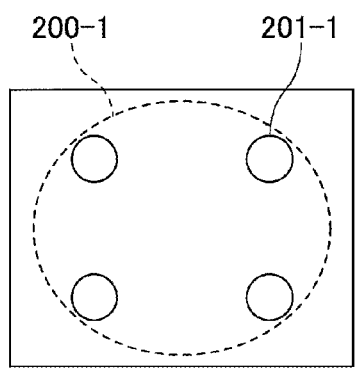
FIGS. 16A and 16B are diagrams for explaining an example of a reflectivity estimation process.
Figure 16B:
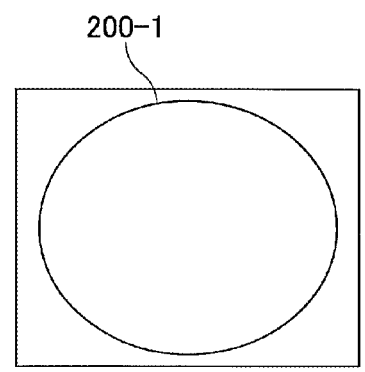

A description will now be given of an example of the reflectivity estimation process. This example utilizes the spots of the light beams from the LEDs 19 of the imaging apparatus 1B formed on the capturing target. FIGS. 16A and 16B are diagrams for explaining this example of the reflectivity estimation process. FIG. 16A illustrates the spots 201-1 of the light beams from the LEDs 19 of the imaging apparatus 1B formed on the capturing target, and FIG. 16B illustrates the imaging region 200-1 of the imaging apparatus 1B for capturing the image of the capturing target to be matched with the registered image. As described above, a height $Z_s$ ($Z_s = H_1$ in this example) of the spot 201-1 of the light beam from the LED 19 formed on the capturing target can be estimated accurately. In addition, a luminance value $I_s$ of the image to be matched, at the position on the capturing target where the spot 201-1 of the light beam is formed can be acquired by the method described above. The luminance value $I_r$ of the reference object 8 at the height $Z_s$ can be acquired from the luminance acquiring unit 243. For this reason, a reflectivity $R_f$ of the capturing target captured by the imaging apparatus 1B can be estimated based on the following formula.

$$R_f = I_s/I_r$$

Of course, the shapes of the spots 201-1 and the imaging region 200-1 are not limited to the circular or approximately circular shapes.

In a case in which a plurality of spots of the light beams are formed on the capturing target, an average value of the reflectivities $R_f$ computed from each of the spots may be utilized. In addition, in the case of the biometric authentication utilizing the vein of the palm 3, the spot of the light beam may by chance be formed at a position of the vein where the luminance value is relatively low. By taking such a situation into consideration, amongst the four reflectivities $R_f$ computed from the four spots of the light beams formed on the capturing target, the average value may be obtained from three reflectivities $R_f$ computed from three spots by excluding the lowest reflectivity Rf computed from the spot where the luminance value is the lowest.

In FIG. 14, the control unit 21 in step S21 controls the luminance acquiring unit 243 and the correction process unit 241 to perform the luminance correction process. In the luminance correction process, the luminance acquiring unit 243 acquires the luminance value of the reference object 8 at the height $Z=Z_r$, stored in the storage unit 22, and the correction process unit 241 corrects and stores in the storage unit 22 the luminance value of the pixel (x, y) at each coordinate point of the image data to be matched stored in the storage unit 22, based on the computed correction coefficient α(x, y) using the correction formula described above. The luminance correction process in this embodiment differs from that of the first embodiment in that the luminance correction process represented by the following formula, using the reflectivity $R_f$ estimated by the reflectivity estimation process described above, is performed with respect to the captured image, and that the height of the capturing target (user's palm 3 in this example) measured by the distance measuring process described above, or the average of the measured heights of the capturing target, is used as the height of the reference object 8.

$$I'(x,y)=I(x,y)/R_f$$

The formula above that is used to obtain the luminance value of the reference object 8 is represented in a form dependent on the distance $D_r$. However, when an angle formed by a normal direction at a point of interest on the reference object 8 and an imaginary line connecting the light source of the imaging apparatus 1A (or 1B) and the point of interest is denoted by Δθ, the formula above used to obtain the luminance value of the reference object 8 includes a term cos Δθ to be more accurate. This term cos Δθ indicates that the angle Δθ differs and the decrease in the amount of light differs depending on the position of the point of interest on the reference object 8. Compared to the distance $D_r$, the effects of the term cos Δθ are relatively small, and for this reason, the term cos Δθ is omitted in the example described above. Of course, the luminance value of the reference object 8 may be obtained by taking this term cos Δθ into consideration.

In each of the embodiments described above, the accuracy of the biometric authentication can be improved, by applying the computation of the three-dimensional shape of the capturing target to the biometric authentication. Each of the embodiments described above may further perform processes (1) through (4) described hereunder.

Figure 17:
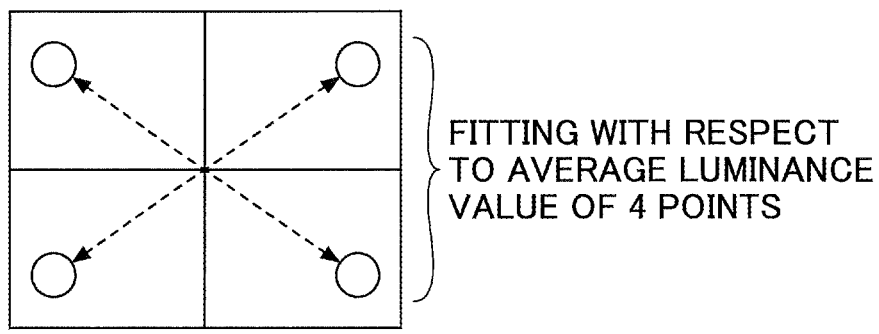
FIG. 17 is a diagram for explaining an example of smoothing luminance values of a reference object.

(1) Noise Reduction Process Utilizing Symmetry of Illumination:

FIG. 17 is a diagram for explaining an example of smoothing luminance values of a reference object. In the case of the imaging apparatus 1A (or 1B) that captures the vein of the palm 3, the light sources (for example, LEDs 11B) are arranged in the periphery of the imaging optical system 15 by regarding the imaging optical system 15 as the center of the light sources, as illustrated in FIG. 6 (or FIG. 12). Hence, a noise reduction effect can be obtained by performing the fitting described above with respect to the average value of the luminance values at four mutually symmetrical points on the captured image, indicated by circular marks in FIG. 17, for example.

Figure 18:
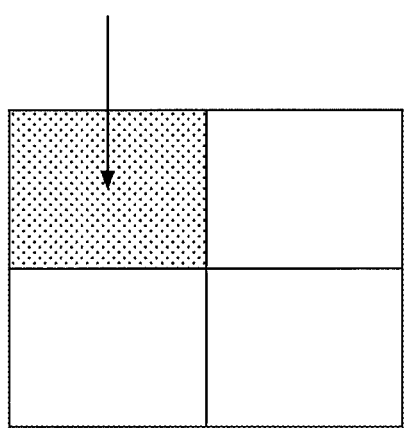
FIG. 18 is a diagram for explaining an example of storing fitting coefficients of the luminance values of the reference object.

(2) Coefficient Reduction Process Utilizing Symmetry of Illumination:

FIG. 18 is a diagram for explaining an example of storing fitting coefficients of the luminance values of the reference object. In the case of the imaging apparatus 1A (or 1B) that captures the vein of the palm 3, the light sources (for example, LEDs 11B) are arranged in the periphery of the imaging optical system 15 by regarding the imaging optical system 15 as the center of the light sources, as illustrated in FIG. 6 (or FIG. 12). Hence, it is sufficient to compute and store the data of the coefficients A, B, and C described above only for a region corresponding to ¼ of the captured image, indicated by a shaded area in FIG. 18, for example. As a result, a coefficient reduction effect can be obtained, in which the speed of the computation process of the computing process unit 242 or the like is increased, and a storage region of the storage unit 22 utilized for the computation process is reduced.

(3) Speed Improvement By Applying Image Reduction Process:

The computation based on the SFS computation model may require a relatively long processing time depending on the SFS computation model. For example, in the method described in E. Prados et al., "Shape from Shading: a well-posed problem?", INRIA, No. 5297, pp. 1-55, August 2004, a solution is obtained by numerically solving a differential equation by iterative operation, and the processing time of the computation becomes long depending on the conditions (for example, resolution of image or required accuracy) of the computation. On the other hand, concavo-convex information related to small concavo-convex contours or irregularities existing on the capturing target is unnecessary when detecting the inclination of the capturing target. Hence, the speed of the computation process can be increased while obtaining the required information (that is, inclination information), by reducing the captured image of the capturing target before processing the captured image.

(4) User Guidance By Utilizing Angle Information Computed by SFS:

In addition, the three-dimensional information obtained by the computation based on the SFS computation model may be utilized, not only for the normalization process of the biometric authentication process, but also for guiding the user. In this case, the three-dimensional information may be acquired by performing the computation based on the SFS computation model with respect to the captured image of the user's palm 3, and when the palm 3 is inclined, a message may be displayed, for example, in order to urge the user to correct the inclination of the user's palm 3. In such a case, the concavo-convex information related to the small concavo-convex contours or irregularities existing on the capturing target is unnecessary. Hence, the speed of the computation process can further be increased while obtaining the required information (that is, inclination information), by reducing the captured image of the capturing target before processing the captured image.

The image processing method described above may be applied to imaging apparatuses in general, and is particularly suited for the biometric authentication apparatus that utilizes the vein of the palm. In the biometric authentication utilizing the vein of the palm, the three-dimensional shape of the palm is measured by the SFS technique, and as described above, the position of the palm, that is, the three-dimensional orientation of the palm including the inclination of the palm, can be obtained. The accuracy of the biometric authentication can be improved by correcting the inclination of the palm by the image processing.

According to the image processing apparatus, the biometric authentication apparatus, the image processing method, the program, and the computer-readable storage medium in each of the embodiments described above, it is possible to recognize the shape of the capturing target with a high accuracy.

The description above use terms such as "determine", "identify", or the like to describe the embodiments, however, such terms are abstractions of the actual operations that are performed. Hence, the actual operations that correspond to such terms may vary depending on the implementation, as is obvious to those skilled in the art.

Although the embodiments are numbered with, for example, "first," or "second," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A biometric authentication apparatus comprising:
a light source configured to irradiate light on a biometric target;
an imaging device configured to capture an image including the biometric target;
a storage configured to store a correction coefficient for each of a plurality of positions on a reference object, the correction coefficient being represented by $\alpha(x, y)=P/\{I_r(x, y)\cdot D_r^2(x, y)\}$, where P denotes a constant, $I_r(x, y)$ denotes a luminance value at x and y coordinates of a captured image of the reference object, (x, y) represents an XY coordinate system in which a center of the captured image of the reference object is located at a center coordinate (0, 0), and $D_r$ denotes a distance from the light source to the x and y coordinates on the reference object that is located at one or a plurality of heights $Z=Z_r$ represented in an XYZ coordinate system; and
a processor configured to perform a process including
computing a luminance at each of a plurality of positions on the biometric target within the image captured by the imaging device; and
correcting the luminance at each of the plurality of positions on the biometric target within the image captured by the imaging device, based on the correction coefficient at each of the plurality of positions on the reference object.

2. The biometric authentication apparatus as claimed in claim 1, wherein the correcting corrects the luminance at each of the plurality of positions on the biometric target within the image captured by the imaging device, based on the correction coefficient for each distance $D_r$ from the light source to the x and y coordinates on the reference object that is located at one of the plurality of heights $Z=Z_r$.

3. The biometric authentication apparatus as claimed in claim 1, wherein
the storage stores a correction coefficient for each of the plurality of positions within the captured image of the reference object, according to the distance from the light source that irradiates light on the reference object to each of the plurality of positions on the reference object corresponding to the plurality of positions within the image of the target object captured by the imaging device, and the luminance value at each of the plurality of positions on the reference object that is located at the one or plurality of heights $Z=Z_r$.

4. The biometric authentication apparatus as claimed in claim 3, wherein an amount of correction of the luminance is larger as a distance from the light source to the biometric target becomes longer.

5. The biometric authentication apparatus as claimed in claim 4, wherein the correction coefficient is proportional to an inverse of the luminance, and is proportional to the distance, from the light source to each of the plurality of positions on the biometric target, to a power of −2.

6. The biometric authentication apparatus as claimed in claim 3, wherein the processor performs the process further including
computing an inclination of the biometric target from a distribution of the luminance.

7. The biometric authentication apparatus as claimed in claim 6, wherein the processor performs the process further including
correcting a position of the biometric target, based on the inclination of the biometric target.

8. The biometric authentication apparatus as claimed in claim 3, wherein the processor performs the process further including
measuring a distance from the light source to the biometric target.

9. A biometric authentication method comprising:
acquiring a captured image by capturing a biometric target irradiated with light from a light source by an imaging apparatus;
measuring, by a processor, a luminance at each of a plurality of positions on the biometric target within the captured image; and
correcting, by the processor, the luminance at each of the plurality of positions on the biometric target within the captured image, based on a correction coefficient at each of a plurality of positions on a reference object, stored in a storage, the correction coefficient being represented by $\alpha(x, y)=P/\{I_r(x, y)\cdot D_r^2(x, y)\}$, where P denotes a constant, $I_r(x, y)$ denotes a luminance value at x and y coordinates of a captured image of the reference object, (x, y) represents an XY coordinate system in which a center of the captured image of the reference object is located at a center coordinate (0, 0), and $D_r$ denotes a distance from the light source to the x and y coordinates on the reference object that is located at one or a plurality of heights $Z=Z_r$ represented in an XYZ coordinate system.

10. The biometric authentication method as claimed in claim 9, wherein
the correcting corrects the luminance at each of the plurality of positions on the biometric target within the captured image, based on the correction coefficient for each distance $D_r$ from the light source to the x and y coordinates on the reference object that is located at one of the plurality of heights $Z=Z_r$.

11. A non-transitory computer-readable storage medium having stored therein a program which, when executed by a computer, causes the computer to perform a biometric authentication process with respect to a captured image of a biometric target irradiated with light from a light source and captured by an imaging apparatus, the biometric authentication process comprising:
measuring a luminance at each of a plurality of positions on the biometric target within the captured image; and
correcting the luminance at each of the plurality of positions within the captured image, based on a correction coefficient at each of a plurality of positions on a reference object, stored in a storage, the correction coefficient being represented by $\alpha(x, v)=P/\{I_r(x, y) \cdot D_r^2(x, y)\}$, where P denotes a constant, $I_r(x, y)$ denotes a luminance value at x and y coordinates of a captured image of the reference object, (x, y) represents an XY coordinate system in which a center of the captured image of the reference object is located at a center coordinate (0, 0), and $D_r$ denotes a distance from the light source to the x and y coordinates on the reference object that is located at one or a plurality of heights $Z=Z_r$ represented in an XYZ coordinate system.

12. The non-transitory computer-readable storage medium as claimed in claim 11, wherein the
    correcting corrects the luminance at each of the plurality of positions on the biometric target within the captured image, based on the correction coefficient for each distance $D_r$ from the light source to the x and y coordinates on the reference object that is located at one of the plurality of heights $Z=Z_r$.

13. The non-transitory computer-readable storage medium as claimed in claim 11, wherein
    the correcting makes access to the storage that stores the correction coefficient for each of the plurality of positions within the captured image of the reference object, according to the distance from the light source that irradiates light on the reference object to each of the plurality of positions on the reference object corresponding to the plurality of positions within the captured image of the target object, and the luminance value at each of the plurality of positions on the reference object that is located at the one or plurality of heights $Z=Z_r$.

14. The non-transitory computer-readable storage medium as claimed in claim 13, wherein an amount of correction of the luminance is larger as the distance from the light source to the biometric target becomes longer.

15. The non-transitory computer-readable storage medium as claimed in claim 14, wherein the correction coefficient is proportional to an inverse of the luminance, and is proportional to the distance, from the light source to each of the plurality of positions on the biometric target, to a power of −2.

16. The non-transitory computer-readable storage medium as claimed in claim 13, wherein the biometric authentication process further comprises:
    computing an inclination of the biometric target from a distribution of the luminance.

17. The non-transitory computer-readable storage medium as claimed in claim 16, wherein the biometric authentication process further comprises:
    correcting a position of the biometric target, based on the inclination of the biometric target.

18. The non-transitory computer-readable storage medium as claimed in claim 13, wherein the biometric authentication process further comprises:
    measuring a distance from the light source to the biometric target.

* * * * *